Patented Sept. 5, 1944

2,357,669

UNITED STATES PATENT OFFICE 2,357,669

REMOVABLE FITTING FOR CORRUGATED FLEXIBLE HOSE

Philip L. Lake, Fort Lauderdale, Fla.

Application June 26, 1943, Serial No. 492,382

4 Claims. (Cl. 285—72)

This invention relates to renewable fittings for parallel corrugated flexible hose, the principal object of the invention being to provide a fitting which is adapted to engage one of the parallel corrugations of the hose and effectively retain the hose and its braided covering in fixed relation within the fitting.

A further object of the invention is to provide a fitting comprising a minimum number of parts and which can readily be removed from a broken end of the hose and replaced on said hose without the use of special tools, the present invention constituting a simplification of the device shown and described in Patent No. 2,113,211, granted to me on April 5, 1938.

In the drawing accompanying this specification,

Figure 1:
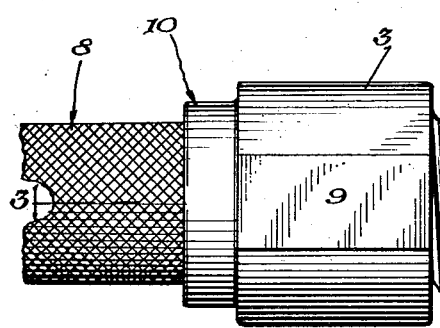
Fig. 1 is a side elevation of a fitting constructed in accordance with the present invention and showing a piece of hose secured therein.

Referring to the drawing, as in my prior patent hereinbefore referred to, the fitting comprises three essential parts, namely, an inner or core member 1, an intermediate bushing 2, split longitudinally into two parts, and an exterior sleeve or collar member 3.

Figure 2:
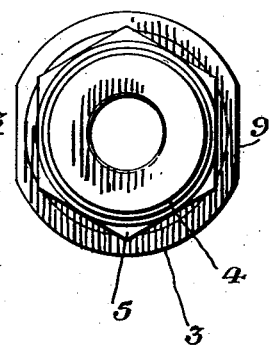
Fig. 2 is an end view of Fig. 1.

The core member 1 is longitudinally bored, the diameter of the bore corresponding to the effective diameter of the opening through the hose with which it is to be used. The said member 1 is exteriorly threaded at one end thereof as shown at 4, for connection with an interiorly threaded pipe or other connection, said threaded portion being slightly tapered for easy engagement with such pipe connection. To the rear of said threaded end the member 1 has formed thereon a shouldered portion 5 which is preferably flatted at its periphery, as shown in Figs. 1 and 2, for the reception of a wrench. Rearwardly of said shouldered portion the member 1 is exteriorly threaded for a portion of its length for engagement with an interiorly threaded portion of the sleeve 3, as shown at 6 in Fig. 3, and at its rear end beyond the threaded portion 6 the diameter of the core member 1 is reduced so as to form a space between said core and the inner periphery of the sleeve 3 when the sleeve and core are secured together. At its extreme rear end the core member 1 is tapered or beveled to form a seat cooperating with the split bushing 2, 2ᵃ in the manner hereinafter more fully described.

The split bushing, as stated, comprises two exactly similar parts each having a semi-cylindrical skirt portion 2 adapted to occupy the above mentioned space between the core and the sleeve 3, and an interiorly and exteriorly beveled portion 2ᵃ for cooperation with the beveled seat formed on the core and also with a similar seat formed at the inner periphery of the sleeve 3 as hereinafter described.

The sleeve 3 is interiorly threaded at its forward portion for approximately half of its length for engagement with the threaded portion 6 of the core, the remainder of the wall of the sleeve being left smooth or unthreaded so that when the parts are assembled together the unthreaded portion of the sleeve will encircle the skirt portion 2 of the intermediate bushing. For some distance inward from its rear end the inner diameter of the sleeve is reduced so that it snugly encircles the flexible metal hose 7 and its metal braid covering 8, that portion of the sleeve between its skirt-encircling portion and its reduced end portion being beveled to accommodate the exterior bevel of the portion 2ᵃ of the intermediate bushing. The periphery of the sleeve may be hexagonal in form or may be provided merely with two diametrically opposite flats 9 as shown in the drawing for accommodating a wrench. The outer diameter of the sleeve at that portion thereof that extends rearward of the intermediate bushing may also be reduced as indicated at 10, which reduction not only saves metal, but imparts to the fitting a more symmetrical appearance.

Figure 3:
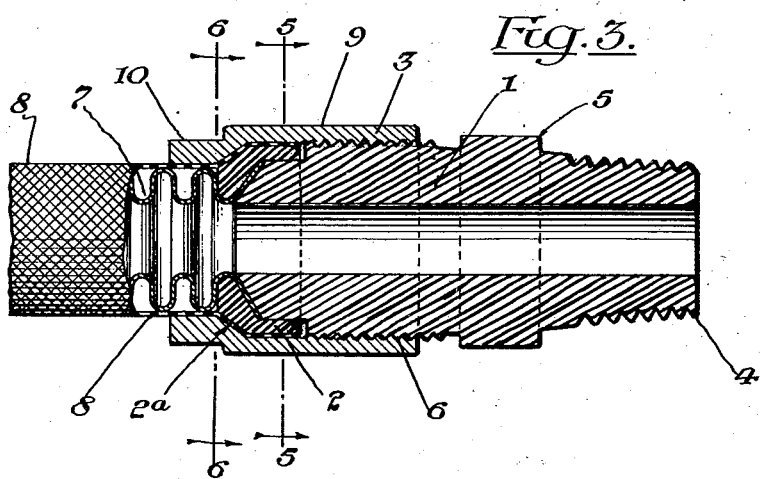
Fig. 3 is a central longitudinal section taken on the line 3—3 of Fig. 1.
Figure 4:
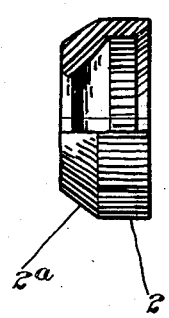
Fig. 4 is a partly sectional side view of a split metal bushing forming a part of the improved fitting.
Figure 5:
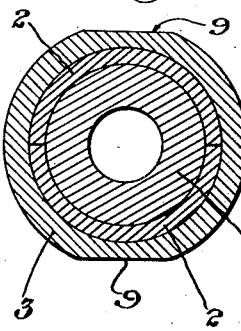
Fig. 5 is a transverse sectional view taken on the line 5—5 of Fig. 3.
Figure 6:
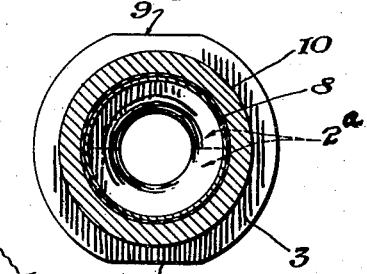
Fig. 6 is a transverse sectional view taken on the line 6—6 of Fig. 3.

One of the advantages of the present invention is the ease with which it can be assembled on the hose. The assembling is accomplished as follows:

The sleeve 3 is first slipped over the end of the braid-covered hose. The braid is then pushed back and by means of a screw driver or other blunt tool the second corrugation of the hose is opened until the portions 2ᵃ of the split bushing can be inserted. The braid is then pulled forward over the entire length of the split bushing and trimmed. The core member 1 is then inserted through the sleeve and seated in the bushing, whereupon the sleeve 3 is brought forward and rotated until the split bushing 2 and braided covering are far enough back in sleeve 3 that the first thread on core 1 can be engaged. A wrench may then be applied to the sleeve to pull the parts together until the core is fully seated so that the end of the hose is gripped between the beveled seat formed by the core and bushing, while the end of the braid is gripped between the sleeve and the periphery of the bushing, as shown in Fig. 3.

It will be obvious from the foregoing that the present improvement not only considerably simplifies the construction and operation of the device but results in a substantial saving of metal and at the same time forms a complete metal-to-metal contact. It will also be noted that when the parts are assembled together the bushing is completely concealed between the inner member and sleeve.

Having thus described my invention, what I claim and desire to secure by Letters Patent is:

1. A fitting for corrugated metal hose, comprising an inner tubular member having a pair of separated exteriorly threaded portions, an intermediate split bushing encircling a part of said inner member, and a sleeve in threaded engagement with another part of the inner member, said sleeve and inner member forming between them a compartment completely enclosing the bushing.

2. A fitting for corrugated metal hose, comprising an inner tubular member having an exteriorly threaded portion and a portion of smaller diameter adjacent to said threaded portion, a split bushing having a skirt portion encircling said smaller portion of the inner member, said inner member and bushing having cooperating beveled seat portions for clamping an end of the hose between them, and a sleeve interiorly threaded at one end thereof for engagement with the threaded portion of the inner member, the diameter of the sleeve at its opposite end being reduced thereby to snugly encircle the hose and conceal the bushing between the sleeve and the inner member.

3. A fitting for corrugated metal hose having a braided covering, comprising an inner tubular member having an exteriorly threaded portion and a portion of smaller diameter adjacent to said threaded portion, a split bushing having a skirt portion encircling said smaller portion of the inner member, and a sleeve interiorly threaded at one end thereof for engagement with the threaded portion of the inner member, the diameter of the sleeve at its opposite end being reduced thereby to snugly encircle the braid-covered hose and conceal the bushing between the sleeve and the inner member, said inner member and sleeve having seats disposed at an angle to their longitudinal axes and said bushing having an inner and an outer angularly disposed seat cooperating with the seats of the inner member and sleeve respectively for gripping the end of the hose and its braided covering.

4. A fitting for corrugated metal hose having a braided covering, comprising an inner tubular member having an exteriorly threaded portion and a portion of smaller diameter adjacent to said threaded portion, a split bushing having a skirt portion encircling said smaller portion of the inner member and a seat-forming portion adapted to engage one of the corrugations of the hose inside of its braided covering, and a sleeve interiorly threaded at one end thereof for engagement with the threaded portion of the inner member, the diameter of the sleeve at its opposite end being reduced thereby to snugly encircle the braid-covered hose and conceal the bushing between the sleeve and the inner member, said inner member and sleeve having seats cooperating with the seat-forming portion of the bushing to grip the end of the hose between the inner member and bushing and the braided covering between the sleeve and bushing.

PHILIP L. LAKE.